United States Patent
Zheng

(10) Patent No.: US 10,042,366 B2
(45) Date of Patent: Aug. 7, 2018

(54) CONTROL METHOD AND SYSTEM FOR ADJUSTING RELATIVE POSITION OF MOBILE HOUSEHOLD DEVICE WITH RESPECT TO HUMAN

(71) Applicant: Huizhou TCL Mobile Communication Co., Ltd., Huizhou, Guangdong (CN)

(72) Inventor: Yu Zheng, Guangdong (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 309 days.

(21) Appl. No.: 14/891,326

(22) PCT Filed: Sep. 11, 2014

(86) PCT No.: PCT/CN2014/086290
§ 371 (c)(1),
(2) Date: Nov. 14, 2015

(87) PCT Pub. No.: WO2015/192491
PCT Pub. Date: Dec. 23, 2015

(65) Prior Publication Data
US 2016/0179101 A1    Jun. 23, 2016

(30) Foreign Application Priority Data
Jun. 20, 2014    (CN) .......................... 2014 1 0278198

(51) Int. Cl.
*G05D 3/00* (2006.01)
*G05B 15/02* (2006.01)
*G05D 1/02* (2006.01)

(52) U.S. Cl.
CPC ............... *G05D 3/00* (2013.01); *G05B 15/02* (2013.01); *G05D 1/0214* (2013.01);
(Continued)

(58) Field of Classification Search
None
See application file for complete search history.

(56) References Cited

U.S. PATENT DOCUMENTS 5,684,696 A * 11/1997 Rao ..................... B60K 31/0008
                                                                    318/587
7,818,090 B2    10/2010 Okamoto
(Continued)

FOREIGN PATENT DOCUMENTS

CN    101077578 A    11/2007
CN    101971116 A    2/2011
(Continued)

*Primary Examiner* — Asok K Sarkar
(74) *Attorney, Agent, or Firm* — Andrew C. Cheng

(57) ABSTRACT

A control method and system for adjusting the relative position of a mobile household with respect to a human is provided by the present disclosure. The mobile household device obtains the location information of the target object at multiple time points, and, according to the obtained location information, determines the current moving direction and positional relation of the target object relative to the mobile household device, and moves to the dominant hand side of the target object according to preset conditions. By detecting and analyze the state of the user, the mobile household device can actively adjust its motion, thus improving its intelligence level.

10 Claims, 2 Drawing Sheets

(52) U.S. Cl.
CPC ......... *G05D 1/0278* (2013.01); *G05D 1/0285* (2013.01); *G05D 2201/0215* (2013.01)

(56) References Cited

U.S. PATENT DOCUMENTS

| | | |
|---|---|---|
| 2004/0193323 A1 | 9/2004 | Higaki et al. |
| 2010/0324771 A1 | 12/2010 | Yabushita et al. |
| 2012/0245733 A1 | 9/2012 | Björn et al. |
| 2013/0325244 A1 | 12/2013 | Wang et al. |

FOREIGN PATENT DOCUMENTS

| | | |
|---|---|---|
| CN | 103170973 A | 6/2013 |
| CN | 103271699 A | 9/2013 |
| CN | 103487066 A | 1/2014 |

\* cited by examiner

CONTROL METHOD AND SYSTEM FOR ADJUSTING RELATIVE POSITION OF MOBILE HOUSEHOLD DEVICE WITH RESPECT TO HUMAN

FIELD OF THE DISCLOSURE

The present disclosure relates to the field of household device and robot control, and in particular, to a control method and system for adjusting the relative position of a mobile household device with respect to a human.

BACKGROUND OF THE DISCLOSURE

Mobile household devices like smart vacuum cleaners and electronic pets have come into innumerable households. These devices are all integrated with intelligent technologies and communication technologies such that they can perform set tasks. Their highly intelligent property greatly enhances the user experience. However, current mobile household devices generally move in accordance with a predetermined path when it is working, if a person happens to appear on its moving path, the mobile household device would probably collide with the person. Thus one has to avoid colliding with these mobile household devices; while for the aged and children, performing an avoidance action is rather dangerous. Especially when the mobile household device is approaching from behind one's body, since the person cannot keep abreast of the orientation of the device, he/she may take a wrong action for avoidance. Thus, for example, he/she may tread on or kick the household device that is in motion, bringing damage or harm to the device or the person himself/herself.

In addition, since the mobile household device is constantly moving, orientation of its operation panel would also be changing in accordance with the movement of device. Hence, the operation panel of the mobile household device may be positioned in an inconvenient or awkward position for the person's operation. Currently, when faced with this situation, the user has no other choices but can only make active adjustments to coordinate with the mobile household device, which largely reduces the intelligence level of the mobile household device.

Therefore, the prior art has yet to be improved and developed.

SUMMARY OF THE DISCLOSURE

In view of the aforementioned deficiencies existing in the prior art, objective of the present disclosure is to provide a control method and system for adjusting the relative position of a mobile household device with respect to another object (generally a human), so as to preclude the collision between the human and the household device, and to optimize the relative positional relation between the device and the human, thereby improving the quality of man-machine interaction.

One technical solution adopted by the present disclosure is as below.

A control method for adjusting a relative position of a mobile household device with respect to a human, comprising the following steps:

locating by the mobile household device and obtaining the location information of a target object at multiple time points, wherein the mobile household device may be enabled with indoor and/or outdoor positioning capabilities, the outdoor positioning capabilities can be realized by global positioning system (GPS), and the indoor positioning capabilities can be achieved by wireless fidelity (WIFI) positioning, Bluetooth positioning and radiation sensing positioning;

wherein locating by the mobile household device comprises: choosing the mobile household device itself as an origin, the orientation of the front side of the mobile household device pointing front as a positive half of Y axis to establish a rectangular coordinate system. The front side of the mobile household device is the side facing right ahead when the mobile household device is moving in accordance with a planned path; obtaining the location information of the target object at the multiple time points comprises: locating the target object and utilizing the rectangular coordinate system to obtain the position coordinates of the target object at two subsequent time points;

according to the obtained location information of the target object at the multiple time points, determining the current moving direction and positional relation of the target object relative to the mobile household device; and according to the resultant moving direction and positional relation of the target object relative to the mobile household device, moving by the mobile household device to a dominant hand side of the target object in accordance with preset handedness rules.

Another control method for adjusting a relative position of a mobile household device with respect to a human is provided, comprising the following steps:

locating by the mobile household device and obtaining the location information of the target object at multiple time points;

according to the obtained location information of the target object at the multiple time points, determining a current moving direction and positional relation of the target object relative to the mobile household device; and according to the resultant moving direction and positional relation of the target object relative to the mobile household device, moving by the mobile household device to a dominant hand side of the target object in accordance with preset handedness rules.

A control system for adjusting a relative position of a mobile household device with respect to a human is provided, comprising:

a positioning module, being configured to locate by the mobile household device and obtain the location information of a target object at multiple time points;

a computing and control module, being configured to, according to the obtained location information of the target object at the multiple time points, determine a current moving direction and positional relation of the target object relative to the mobile household device;

a motion drive module, being configured to, according to the resultant moving direction and positional relation of the target object relative to the mobile household device that is obtained by the computing and control module, move the mobile household device to a dominant hand side of the target object in accordance with preset handedness rules.

Beneficial effects of the present disclosure are: providing a control method and system for adjusting the relative position of the mobile household device with respect to a human. The system according to the present disclosure can detect and analyze the state of the user when the mobile household device is autonomously moving, and can actively adjust the motion of the mobile household device in accordance with preset using habits of the user, thus enabling the household device capable of avoiding a collision with the user and of standing always at the position where the user is accustomed to manipulate. This improves the intelligence level of the mobile household device, and thus further enhances the product experience of related products.

DETAILED DESCRIPTION OF THE DISCLOSURE

The present disclosure provides a control method and system for adjusting the relative position of a mobile household device with respect to a human. In order to make purposes and technical solutions and effects of the present disclosure clear and definite, below a further detailed description will be made on the present disclosure. It should be appreciated that specific embodiments described herein are merely used to illustrate but not to limit the present disclosure.

In the following description, specific embodiments of the present disclosure will be described with reference to steps or symbols executed by one or more computers, unless otherwise stated. Therefore, these steps and operations will be mentioned more than once to be executed by computers. Computer execution referred to herein comprises operations performed by computer processing units which represent electronic signals of data within a structured type. These operations transform the data or maintain the data in the memory system of the computer, and the data can be reconfigured or otherwise change the functioning of the computer through means well known by one of ordinary skill in the art. Data structure maintained by the data is the physical location of the memory. The data structure comprises particular characteristics defined by the data format. Although the principles of the present disclosure are illustrated by the above text, it should not be construed as a limit to the present disclosure, and one of ordinary skill in the art will understand that steps and operations described below can also be implemented by hardware.

Principles of the present disclosure are performed by utilizing a number of other general-purposed or special-purposed operation environments, communication environments or configurations. Examples of well known operation systems, operation environments and configurations applicable to the present disclosure can comprise, but are not limited to, hand-held phones, personal computers, servers, multi-processor systems, micro-computer based systems, main frame computers and distributed computing environments including any of the above mentioned systems or apparatuses.

The term "module" can be regarded as software objects executed on the computing system. Various components, modules, engines and services described herein can be regarded as objects implemented on the computing system. And apparatuses and methods described herein are preferably implemented in the form of software, and can without doubt be implemented by hardware, both falling within the scope of claims of the present disclosure.

Figure 1:
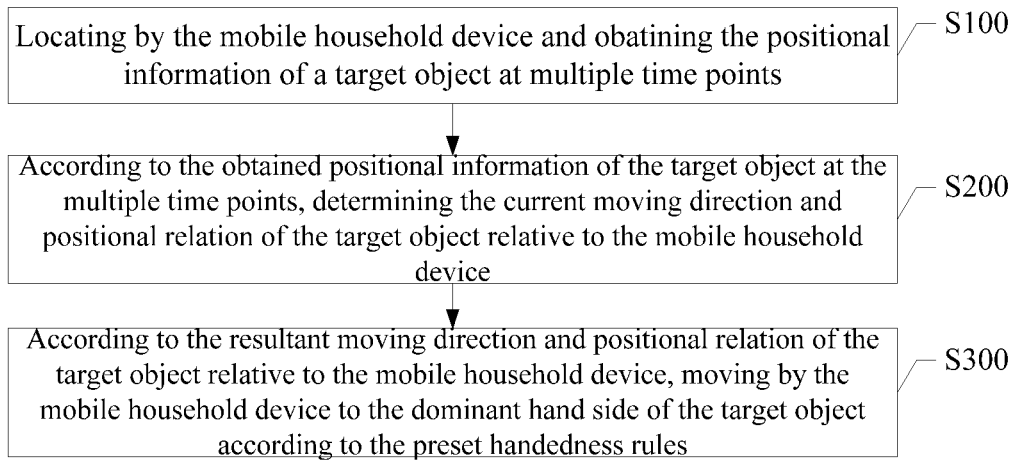
FIG. 1 is a flow chart diagram of a control method for adjusting a relative position of a mobile household device with respect to a human according to a specific embodiment of the present disclosure.

As is shown in FIG. 1, a control method for adjusting the relative position of a mobile household device with respect to a human is provided, the control method comprising the following steps:

S100: Locating by the mobile household device and obtaining the location information of the target object at multiple time points.

The mobile household device is enabled with indoor and/or outdoor positioning capabilities. The outdoor positioning capabilities can be realized through GPS (global positioning system), and the indoor positioning capabilities can be achieved via WIFI (wireless-fidelity) positioning, Bluetooth positioning, radiation sensing positioning (e.g., infrared sensing positioning). The above-mentioned various positioning approaches are grounded by well mature techniques, thus the realization of these positioning approaches won't be given details.

The obtained location information of the target object at multiple time points is a relative position of the target object with respect to the mobile household device or an absolute position of the target object with reference to a stationary reference object. Namely, when the mobile household device is chosen as the reference object, since the device itself is also moving, the obtained location information of the target object is the relative location information; when a fixed location or a stationary object is chosen as the reference object, then the obtained location information of the target object is the absolute location information.

Typically, intervals between every two subsequent time points of the multiple time points are the same, namely, the mobile household device regularly obtains the location information of the target object. For example, the mobile household device performs one sampling every 0.5 seconds. The sampling time intervals can be configured according to performance of the device and to actual needs.

Figure 2:
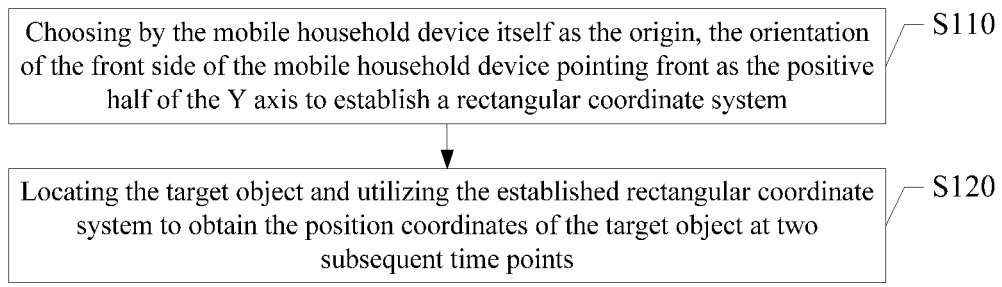
FIG. 2 is a flow chart diagram of specific methods of the step S100 as shown in FIG. 1.

In an exemplary embodiment, the location information of the target object in the above-mentioned step is obtained by choosing the mobile household device as the reference object; therefore the step S100 comprises the following particular steps, as is illustrated in FIG. 2:

S110: Choosing by the mobile household device itself as an origin, the orientation of the front side of the mobile device as a positive half of Y axis to establish a rectangular coordinate system. The front side of the mobile household device is the side that always faces right ahead when the mobile household device is moving in accordance with a planned path. By another definition, the front side of the mobile household device is the side that faces the human more often during the interaction with human, i.e., the side of the mobile household device where input components such as an operation panel or interactive components such as a display are mounted. Opposite to the front side, the back side of the mobile household device is the side that faces the human less often. Certainly, if a device has multiple sides that can interact with a human, then the front side should be perceived as a relative concept, namely, the side that currently faces the human.

The planned or predetermined path is the device-stored moving path under the operating mode based on factory design. And it can also be a route for dynamic monitoring and planning, for example, a cleaning robot can draw a map of a site and design a cruise route in self-learning, thus, guaranteeing that, in the self-cleaning process, it will move in accordance with the predetermined moving path ensuring that every position in the environment can be cleaned. Based on the definition of the front side of the mobile household device given by the present disclosure, when the mobile household device is moving, the front side of the mobile household device will always face its moving direction. Further, the orientation of the front side of the mobile household device pointing front is chosen as the positive half of Y axis of the established rectangular coordinate system. Thus, orientation of the Y axis will always point to the moving direction of the mobile household device. In addition, when the target object is positioned at the back side of the mobile household device, the original coordinate system can be rotated horizontally around the origin for 180 degrees, and the computing and judging logic of mobile household device remains the same.

S120: Locating the target object and utilizing the established rectangular coordinate system to obtain position coordinates of the target object at two subsequent time points.

Practical experiments show that, analyzing the position coordinates of the target object at only two subsequent time points would be sufficient to determine the moving direction of the target object and the positional relation between the target object and the device. Thus, in an exemplary embodiment, only coordinates of the target object at two subsequent positions are obtained. Beneficially, obtaining fewer position coordinates can reduce the information amount processed by the system, and thus increase the processing speed of the system accordingly.

Additionally, above-mentioned step of utilizing the established rectangular coordinate system to obtain the position coordinates of the target object at the two subsequent time points specifically comprises:

locating and obtaining the position coordinates of the target object at the subsequent time point in the rectangular coordinate system where coordinates of the target object at the previous time point are obtained.

The above-mentioned arrangement is based on the following reasons: when the mobile household device itself is always chosen as the origin to establish the coordinate system to obtain the position coordinates of the target object for computation, since the mobile household device may also be moving (angular and linear motion relative to the target object) during the two subsequent time points, which inevitably causes a variation of the coordinate system, eventually resulting in an offset of the acquired positional data. However, considering that processing speed of the mobile household device is limited and thus related algorithms need to be simplified, the above-mentioned offset is acceptable (i.e., presence of the offset won't influence the final control process). Therefore, the above steps are arranged to simplify related algorithms, namely, the coordinate system utilized by the mobile device to obtain the position coordinates of the target object at the subsequent time point is the coordinate system utilized where position coordinates of the target object at the previous time point are measured. In this way, algorithms are simplified without influencing subsequent logic judgments, thus reducing the information amount processed by the device. Certainly, if the offset is unacceptable under special circumstances, then absolute location information will be adopted by the mobile household device in order to perform the computation of the position coordinates of the target object.

S200: According to the obtained location information of the target object at the multiple time points, determining a current moving direction and positional relation of the target object relative to the mobile household device.

Figure 3:
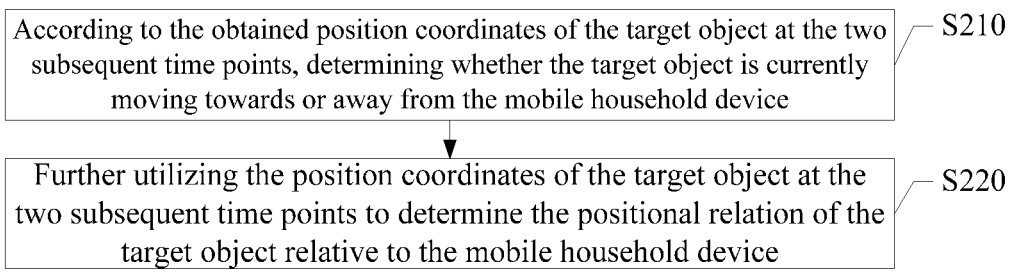
FIG. 3 is a flow chart diagram of specific methods of the step S200 as shown in FIG. 1.

Further, the step S200 specifically comprises the following steps, as is shown in FIG. 3:

S210: According to the obtained position coordinates of the target object at the two subsequent time points, determining whether the target object is moving towards or away from the mobile household device.

Figure 4:
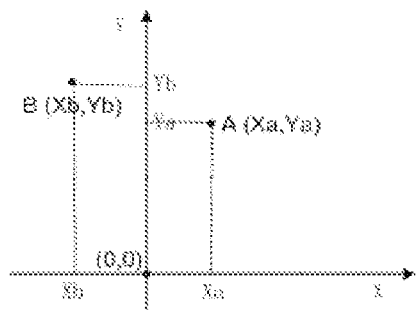
FIG. 4 is a schematic diagram of choosing the mobile household device as an origin, the orientation of the front side of the mobile household device as a positive half of Y axis to establish a rectangular coordinate system according to a specific embodiment of the present disclosure.

The step S210 will be illustrated utilizing the rectangular coordinate system as shown in FIG. 4, origin of the coordinate system (0, 0) is chosen as the mobile household device, and orientation of the positive half of Y axis is chosen as the orientation of the front side of the mobile household device pointing front. Assume that detected coordinates of the target object at the previous time point are (Xa, Ya), while coordinates at the subsequent time point are (Xb, Yb). Then specific judging rules are:

when $(Xa \times Xa + Ya \times Ya) < (Xb \times Xb + Yb \times Yb)$, then the target object is determined to be moving away from the mobile household device;

when $(Xa \times Xa + Ya \times Ya) > (Xb \times Xb + Yb \times Yb)$, then the target object is determined to be moving towards the mobile household device.

S220: Further utilizing the position coordinates of the target object at the two subsequent time points to determine the relative positional relation between the mobile household device and the target object.

In an exemplary embodiment, on judgment premise of the step S210, rules of determining the relative positional relation between the mobile household device and the target object comprises the following specific steps:

when the target object is determined to be moving away from the mobile household device, further judging rules are:

when $Ya/Xa = Yb/Xb$, the mobile household device is determined to be located directly behind the target object;

when $Ya/Xa > Yb/Xb$, the mobile household device is determined to be located behind the right side of the target object;

when $Ya/Xa < Yb/Xb$, the mobile household device is determined to be located behind the left side of the target object.

While when the target object is determined to be moving towards the mobile household device, further judging rules are:

when $Ya/Xa = Yb/Xb$, the mobile household device is determined to be located directly in front of the target object;

when $Ya/Xa > Yb/Xb$, the mobile household device is determined to be located in front of the right side of the target object;

when $Ya/Xa < Yb/Xb$, the mobile household device is determined to be located in front of the left side of the target object.

S300: According to resultant moving direction and positional relation of the target object relative to the mobile household device, moving by the mobile household device to a dominant hand side of the target object in accordance with preset handedness rules.

In an exemplary embodiment, the step S300 specifically comprises:

based on the resultant moving direction and the positional relation of the target object relative to the mobile household device, moving by the mobile household device along the orientation of positive or negative half of X axis of the current coordinate system so as to generate a lateral movement, making the mobile household device move to the dominant hand side of the target object under joint drive of the lateral movement and the movement on the planned path.

Solution according to the present disclosure does not influence the original operation mode and advancing route of the mobile household device. That is, the present disclosure drives the mobile household device to move towards the left or right sides (i.e., move along the X axis) by determining the positional relation between the mobile household device and the target object. It won't influence the motion of the mobile household device along the Y axis (i.e., not influence the movement of the mobile household device under its operation mode (or on the planned path)). The resultant moving path of the mobile household device is a combination of its motions along the Y axis and the X axis.

Specifically, the judgments are further distinguished depending on operational habits of the target object. Thus, handedness habits of the target object can be preset on the mobile household device in order to determine whether the target object is right-handed or left-handed.

When the target object is preset to be right-handed and the target object is determined to be moving away from the mobile household device, then:

if the mobile household device is further determined to be located directly behind the target object or behind the left side of the target object, making the mobile household device move towards the positive orientation of the X axis of the current rectangular coordinate system so as to generate a lateral movement. Thus the mobile household device is moved to the right side of the target object;

if the mobile household device is further determined to be located behind the right side of the target object, then the mobile household device is already located at the habitual operational position of the target object, thus motion of the mobile household device along the Y axis will be maintained while no lateral movement thereof on the X axis of the current rectangular coordinate system will be generated.

When the target object is preset to be right-handed and the target object is determined to be moving towards the mobile household device, then:

if the mobile household device is further determined to be located directly in front of the target object or in front of the left side of the target object, making the mobile household device move towards the negative orientation of the X axis of the current rectangular coordinate system so as to generate a lateral movement. Thus the mobile household device will be moved to the right side position of the target object;

if the mobile household device is further determined to be located in front of the right side of the target object, since the mobile household device is already positioned at the habitual operational position of the target object, thus no lateral movement of the mobile household device along the X axis of the current rectangular coordinate system will be generated.

When the target object is preset to be left-handed and the target object is determined to be moving away from the mobile household device, then:

if the mobile household device is further determined to be located directly behind the target object or behind the right side of the target object, making the mobile household device move towards the negative orientation of the X axis of the current rectangular coordinate system so as to generate a lateral movement. Thus the mobile household device is moved to the left side behind the target object;

if the mobile household device is further determined to be located behind the left side of the target object, then the mobile household device is already located at the habitual operational position of the target object, thus, no lateral movement of the mobile household device along the X axis of the current rectangular coordinate system will be generated.

When the target object is preset to be left-handed, and the target object is determined to be moving towards the mobile household device, then:

if the mobile household device is further determined to be located directly in front of the target object or in front of the right side of the target object, making the mobile household device move towards the positive orientation of the X axis of the current rectangular coordinate system so as to generate a lateral movement. Thus the mobile household device is moved to the left side in front of the target object;

if the mobile household device is further determined to be located in front of the left side of the target object, the mobile household device won't be moved along the X axis of the current rectangular coordinate system to generate a lateral movement.

Figure 5:
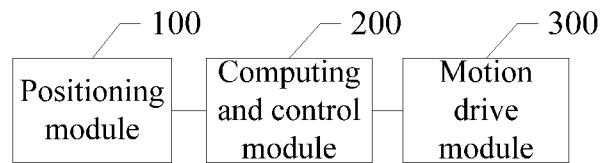
FIG. 5 is a block diagram of a control system for adjusting the relative position of the mobile household device with respect to the human according to a specific embodiment of the present disclosure.

A control system for adjusting a relative position of a mobile household device with respect to a human in accordance with the above descriptions is provided as shown in FIG. 5, comprising:

a positioning module 100, being configured to locate by the mobile household device and obtain the location information of the target object at multiple time points; for detailed description, please refer to step S100.

a computing and control module 200, being configured to, according to the obtained location information of the target object at the multiple time points, determine a current moving direction and positional relation of the target object relative to the mobile household device; for detailed description, please refer to the step S200.

a motion drive module 300, being configured to, according to the resultant moving direction and positional relation of the target object relative to the mobile household device that are obtained by the computing and control module, move the mobile household device to a dominant hand side of the target object in accordance with preset handedness rules; for detailed description, please refer to the step S300.

The present disclosure provides a control method and system for adjusting the relative position of a mobile household device with respect to a human. The system according to the present disclosure can detect and analyze the state of the user when the mobile household device is autonomously moving, and can actively adjust the motion of the mobile household device in accordance with the preset using habits of the user, thus enabling the household device capable of avoiding a collision with the user and of standing always at the position where the user is accustomed to manipulate. This improves the intelligence level of the mobile household device, and thus further improves the convenience of HCI (human computer interaction) with related devices.

Furthermore, it is apparent to those skilled in the art, the present disclosure also provides a control system for adjusting a relative position of a mobile household device with respect to a human, which comprises a non-transitory program storage medium and a processor. The non-transitory program storage medium stores a program executed by the processor to perform the method as described in above. Furthermore, it is apparent to those skilled in the art that, various modules 100, 200, 300 as shown in FIG. 5 are software modules or software units. In another aspect, it is well-known that various software modules or software units are inherently stored in the non-transitory program storage medium and executed by the processor.

It should be appreciated that the application of the present disclosure should not be limited to the above examples, which can be improved or transformed by one of ordinary skill in the art according to the above description. Any improvements or transformations should all be covered within the scope of appended claims of the present disclosure.

What is claimed is:

1. A control method for adjusting a relative position of a mobile household device with respect to a human, comprising the following steps:
locating by the mobile household device and obtaining location information of a target object at multiple time points, wherein the mobile household device is enabled with at least one of indoor and/or outdoor positioning capabilities, the outdoor positioning capabilities are realized by global positioning system (GPS), and the indoor positioning capabilities are achieved via wireless fidelity (WIFI) positioning, Bluetooth positioning and radiation sensing positioning; wherein locating by the mobile household device comprises: choosing the mobile household device itself as an origin, orientation of front side of the mobile household device pointing front as a positive half of Y axis to establish a rectangular coordinate system, the front side of the mobile household device being the side facing right ahead when the mobile household device is moving in accordance with a planned path; obtaining the location information of the target object at the multiple time points comprises: locating the target object and utilizing the established rectangular coordinate system to obtain position coordinates of the target object at two subsequent time points; wherein the step of utilizing the established rectangular coordinate system to obtain the position coordinates of the target object at the two subsequent time points, comprises: locating and obtaining the position coordinates of the target object at the subsequent time point in the rectangular coordinate system where the position coordinates of the target object at the previous time point are obtained;
according to the obtained location information of the target object at the multiple time points, determining a current moving direction and a positional relation of the target object relative to the mobile household device; and
according to the resultant moving direction and positional relation of the target object relative to the mobile household device, moving by the mobile household device to a dominant hand side of the target object in accordance with preset handedness rules; wherein:
the step of according to the obtained location information of the target object at the multiple time points, determining the current moving direction and positional relation of the target object relative to the mobile household device, comprises:
according to the obtained position coordinates of the target object at the two subsequent time points, determining whether the target object is moving towards or away from the mobile household device; wherein the step of according to the obtained position coordinates of the target object at the two subsequent time points, determining whether the target object is currently moving towards or away from the mobile household device, comprises: when $(Xa \times Xa + Ya \times Ya) < (Xb \times Xb + Yb \times Yb)$, the target object is determined to be moving away from the mobile household device, wherein the position coordinates of the target object at the previous time point are $(Xa, Ya)$, and the position coordinates of the target object at the subsequent time point are $(Xb, Yb)$; and when $(Xa \times Xa + Ya \times Ya) > (Xb \times Xb + Yb \times Yb)$, the target object is determined to be moving towards the mobile household device; and
further utilizing the position coordinates of the target object at the two subsequent time points to determine the relative positional relation between the mobile household device and the target object.

2. The control method for adjusting the relative position of the mobile household device with respect to the human according to claim 1, wherein, the obtained location information of the target object at the multiple time points comprises a relative position of the target object with respect to the mobile household device or an absolute position of the target object with respect to a stationary reference object.

3. The control method for adjusting the relative position of the mobile household with respect to the human according to claim 1, wherein the step of further utilizing the position coordinates of the target object at the two subsequent time points to determine the positional relation between the mobile household device and the target object, comprising:
when the target object is determined to be moving away from the mobile household device, further judging rules for determining the positional relation are:
when $Ya/Xa=Yb/Xb$, the mobile household device is determined to be positioned directly behind the target object;
when $Ya/Xa>Yb/Xb$, the mobile household device is determined to be positioned behind the right side of the target object;
when $Ya/Xa<Yb/Xb$, the mobile household device is determined to be located behind the left side of the target object;
while when the target object is determined to be moving towards the mobile household device, further judging rules for determining the positional relation are:
when $Ya/Xa=Yb/Xb$, the mobile household device is determined to be located directly in front of the target object;
when $Ya/Xa>Yb/Xb$, the mobile household device is determined to be located in front of the right side of the target object;
when $Ya/Xa<Yb/Xb$, the mobile household device is determined to be located in front of the left side of the target object.

4. The control method for adjusting the relative position of the mobile household device with respect to the human according to claim 3, wherein the step of according to the resultant moving direction and positional relation of the target object relative to the mobile household device, moving by the mobile household device to the dominant hand side of the target object in accordance with the preset handedness rules, comprising:
based on the resultant moving direction and positional relation of the target object relative to the mobile household device, moving by the mobile household device along an orientation of positive or negative half of X axis of the current coordinate system so as to generate a lateral movement, making the mobile household device move to the dominant hand side of the target object under a joint drive of the lateral movement and its movement on the planned path.

5. The control method for adjusting the relative position of the mobile household device with respect to the human according to claim 4, wherein, when the target object is preset to be right-handed and the target object is determined to be moving away from the mobile household device, then:
  when the mobile household device is further determined to be located directly behind the target object or behind the left side of the target object, making the mobile household device move towards a positive orientation of the X axis of the current rectangular coordinate system so as to generate the lateral movement;
  when the mobile household device is further determined to be located behind the right side of the target object, the mobile household device is not moved along the X axis of the current rectangular coordinate system to generate the lateral movement;
when the target object is preset to be right-handed, and the target object is determined to be moving towards the mobile household device, then:
  when the mobile household device is further determined to be located directly in front of the target object or in front of the left side of the target object, making the mobile household device move towards a negative orientation of the X axis of the current rectangular coordinate system so as to generate the lateral movement;
  when the mobile household device is further determined to be located in front of the right side of the target object, the mobile household device is not moved along the X axis of the current rectangular coordinate system to generate the lateral movement;
when the target object is preset to be left-handed and the target object is determined to be moving away from the mobile household device, then:
  when the mobile household device is further determined to be located directly behind the target object or behind the right side of the target object, making the mobile household device move towards the negative orientation of the X axis of the current rectangular coordinate system so as to generate the lateral movement;
  when the mobile household device is further determined to be located behind the left side of the target object, the mobile household device is not moved along the X axis of the current rectangular coordinate system to generate the lateral movement;
when the target object is preset to be left-handed, and the target object is determined to be moving towards the mobile household device, then:
  when the mobile household device is further determined to be located directly in front of the target object or in front of the right side of the target object, moving the mobile household device towards the positive orientation of the X axis of the current rectangular coordinate system so as to generate the lateral movement;
  when the mobile household device is further determined to be located in front of the left side of the target object, the mobile household device is not moved along the X axis of the current rectangular coordinate system to generate the lateral movement.

6. A control method for adjusting a relative position of a mobile household device with respect to a human, comprising the following steps:
  locating by the mobile household device and obtaining location information of the target object at multiple time points;
  according to the obtained location information of the target object at the multiple time points, determining a current moving direction and a positional relation of the target object relative to the mobile household device; and
  according to the resultant moving direction and positional relation of the target object relative to the mobile household device, moving by the mobile household device to a dominant hand side of the target object in accordance with preset handedness rules; wherein:
  the obtained location information of the target object at the multiple time points comprises a relative position of the target object with respect to the mobile household device or an absolute position of the target object with respect to a stationary reference object;
  the step of locating by the mobile household device and obtaining the location information of the target object at the multiple time points, comprises:
    choosing by the mobile household device itself as an origin, orientation of front side of the mobile household device pointing front as a positive half of Y axis to establish a rectangular coordinate system, wherein the front side of the mobile household device is the side facing right ahead when the mobile household device is moving in accordance with a planned path; and
    locating the target object and utilizing the established rectangular coordinate system to obtain position coordinates of the target object at two subsequent time points; wherein the step of utilizing the established rectangular coordinate system to obtain the position coordinates of the target object at the two subsequent time points, comprises: locating and thus obtaining the position coordinates of the target object at the subsequent time point in the rectangular coordinate system where the coordinates of the target object at the previous time point are obtained;
  the step of according to the obtained location information of the target object at the multiple time points, determining the current moving direction and positional relation of the target object relative to the mobile household device, comprises:
    according to the obtained position coordinates of the target object at the two subsequent time points, determining whether the target object is moving towards or away from the mobile household device; wherein the step of according to the obtained position coordinates of the target object at the two subsequent time points, determining whether the target object is currently moving towards or away from the mobile household device, comprises: when $(Xa \times Xa + Ya \times Ya) < (Xb \times Xb + Yb \times Yb)$, the target object is determined to be moving away from the mobile household device, wherein the position coordinates of the target object at the previous time point are $(Xa, Ya)$, and the position coordinates of the target object at the subsequent time point are $(Xb, Yb)$; and when $(Xa \times Xa + Ya \times Ya) > (Xb \times Xb + Yb \times Yb)$, the target object is determined to be moving towards the mobile household device; and
    further utilizing the position coordinates of the target object at the two subsequent time points to determine the relative positional relation between the mobile household device and the target object.

7. The control method for adjusting the relative position of the mobile household with respect to the human according to claim 6, wherein the step of further utilizing the position coordinates of the target object at the two subsequent time points to determine the positional relation between the mobile household device and the target object, comprising:
    when the target object is determined to be moving away from the mobile household device, further judging rules of determining the positional relation are:
        when Ya/Xa=Yb/Xb, the mobile household device is determined to be located directly behind the target object;
        when Ya/Xa>Yb/Xb, the mobile household device is determined to be located behind the right side of the target object;
        when Ya/Xa<Yb/Xb, the mobile household device is determined to be located behind the left side of the target object;
    while when the target object is determined to be moving towards the mobile household device, further judging rules are:
        when Ya/Xa=Yb/Xb, the mobile household device is determined to be located directly in front of the target object;
        when Ya/Xa>Yb/Xb, the mobile household device is determined to be located in front of the right side of the target object;
        when Ya/Xa<Yb/Xb, the mobile household device is determined to be located in front of the left side of the target object.

8. The control method for adjusting the relative position of the mobile household device with respect to the human according to claim 7, wherein the step of according to the resultant moving direction and positional relation of the target object relative to the mobile household device, moving by the mobile household device to the dominant hand side of the target object in accordance with the preset handedness rules, comprising:
    based on the resultant moving direction and positional relation of the target object relative to the mobile household device, moving by the mobile household device along an orientation of positive or negative half of X axis of the current coordinate system so as to generate a lateral movement, thus making the mobile household device move the dominant hand side of the target object under a joint drive of the lateral movement and its movement on the planned path.

9. The control method for adjusting the relative position of the mobile household device with respect to the human according to claim 8, wherein,
    when the target object is preset to be right-handed and is determined to be moving away from the mobile household device, then:
        when the mobile household device is further determined to be located directly behind the target object or behind the left side of the target object, making the mobile household device move towards a positive orientation of the X axis of the current rectangular coordinate system so as to generate the lateral movement;
        when the mobile household device is further determined to be located behind the right side of the target object, the mobile household device is not moved along the X axis of the current rectangular coordinate system to generate the lateral movement;
    when the target object is preset to be right-handed and is determined to be moving towards the mobile household device, then:
        when the mobile household device is further determined to be located directly in front of the target object or in front of the left side of the target object, making the mobile household device move towards a negative orientation of the X axis of the current rectangular coordinate system so as to generate the lateral movement;
        when the mobile household device is further determined to be located behind the right side of the target object, the mobile household device is not moved along the X axis of the current rectangular coordinate system to generate the lateral movement;
    when the target object is preset to be left-handed, and the target object is determined to be moving away from the mobile household device, then:
        when the mobile household device is further determined to be located directly behind the target object or behind the right side of the target object, making the mobile household device move towards the negative orientation of the X axis of the current rectangular coordinate system so as to generate the lateral movement;
        when the mobile household device is further determined to be located behind the left side of the target object, the mobile household device is not moved along the X axis of the current rectangular coordinate system to generate the lateral movement;
    when the target object is preset to be left-handed, and the target object is determined to be moving towards the mobile household device, then:
        when the mobile household device is further determined to be located directly in front of the target object or in front of the right side of the target object, making the mobile household device move towards the positive orientation of the X axis of the current rectangular coordinate system so as to generate the lateral movement;
        when the mobile household device is further determined to be located in front of the left side of the target object, the mobile household device is not moved along the X axis of the current rectangular coordinate system to generate the lateral movement.

10. A control system for adjusting a relative position of a mobile household with respect to a human, comprising:
    a processor; and
    a non-transitory program storage medium, comprising:
        a positioning module, being configured to locate by the mobile household device and obtain location information of the target object at multiple time points;
        a computing and control module, being configured to, according to the obtained location information of the target object at the multiple time points, determine a moving direction and a positional relation of the target object relative to the mobile household device; and
        a motion drive module, being configured to, according to the resultant moving direction and positional relation of the target object relative to the mobile household device that are obtained by the computing and control module, move the mobile household device to a dominant hand side of the target object in accordance with preset handedness rules; wherein:
        the obtained location information of the target object at the multiple time points comprises a relative position of the target object with respect to the mobile household device or an absolute position of the target object with respect to a stationary reference object;

the positioning module is further configured to:
- choose by the mobile household device itself as an origin, orientation of front side of the mobile household device pointing front as a positive half of Y axis to establish a rectangular coordinate system, wherein the front side of the mobile household device is the side facing right ahead when the mobile household device is moving in accordance with a planned path; and
- locate the target object and utilize the established rectangular coordinate system to obtain position coordinates of the target object at two subsequent time points; wherein the computing and control module is further configured to: locate and thus obtain the position coordinates of the target object at the subsequent time point in the rectangular coordinate system where the coordinates of the target object at the previous time point are obtained;

the computing and control module is further configured to:
- according to the obtained position coordinates of the target object at the two subsequent time points, determine whether the target object is currently moving towards or away from the mobile household device, wherein when $(Xa \times Xa + Ya \times Ya) < (Xb \times Xb + Yb \times Yb)$, the target object is determined to be moving away from the mobile household device, wherein the position coordinates of the target object at the previous time point are $(Xa, Ya)$, and the position coordinates of the target object at the subsequent time point are $(Xb, Yb)$; and when $(Xa \times Xa + Ya \times Ya) > (Xb \times Xb + Yb \times Yb)$, the target object is determined to be moving towards the mobile household device; and
- further utilize the position coordinates of the target object at the two subsequent time points to determine the relative positional relation between the mobile household device and the target object.

* * * * *